US012084056B2

(12) United States Patent
Goodarzi

(10) Patent No.: US 12,084,056 B2
(45) Date of Patent: Sep. 10, 2024

(54) METHODS AND SYSTEMS FOR TRAILER STEERING ASSISTANCE

(71) Applicant: GM GLOBAL TECHNOLOGY OPERATIONS LLC, Detroit, MI (US)

(72) Inventor: Avesta Goodarzi, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 226 days.

(21) Appl. No.: 17/817,323

(22) Filed: Aug. 3, 2022

(65) Prior Publication Data

US 2024/0043005 A1 Feb. 8, 2024

(51) Int. Cl.
*B60W 30/18* (2012.01)
*B60W 50/00* (2006.01)

(52) U.S. Cl.
CPC .. *B60W 30/18036* (2013.01); *B60W 50/0098* (2013.01); *B60W 2050/0022* (2013.01); *B60W 2300/14* (2013.01); *B60W 2520/06* (2013.01); *B60W 2520/10* (2013.01); *B60W 2520/22* (2013.01); *B60W 2530/201* (2020.02); *B60W 2710/20* (2013.01)

(58) Field of Classification Search
CPC ....... B60W 30/18036; B60W 50/0098; B60W 2050/0022; B60W 2300/14; B60W 2520/06; B60W 2520/10; B60W 2520/22; B60W 2530/201; B60W 2710/20; B60W 2530/203; B62D 6/00; B62D 15/021
See application file for complete search history.

(56) References Cited

U.S. PATENT DOCUMENTS

| | | | | |
|---|---|---|---|---|
| 6,292,094 B1 * | 9/2001 | Deng | ..................... | B62D 7/159 701/44 |
| 6,854,557 B1 * | 2/2005 | Deng | ..................... | B62D 7/159 701/41 |
| 2014/0136052 A1 * | 5/2014 | Kossira | ................. | B62D 13/06 701/41 |
| 2014/0277941 A1 * | 9/2014 | Chiu | ..................... | B62D 13/06 701/41 |
| 2019/0092388 A1 * | 3/2019 | Raad | ..................... | B62D 13/06 |
| 2021/0171098 A1 * | 6/2021 | Beech | .................... | B60D 1/155 |
| 2024/0034405 A1 * | 2/2024 | Rust | ...................... | B62D 6/003 |
| 2024/0067268 A1 * | 2/2024 | Herzog | ................. | B60D 1/245 |

\* cited by examiner

*Primary Examiner* — Sze-Hon Kong
(74) *Attorney, Agent, or Firm* — Lorenz & Kopf LLP

(57) ABSTRACT

Methods and systems for vehicles are provided for trailer steering assistance. The system includes a computer system onboard the vehicle and configured to, by a processor: monitor a front steering angle of the vehicle and a hitch angle of the vehicle as the vehicle and the vehicle trailer move in the reverse direction, dynamically adjust a rear steering angle of the vehicle as the vehicle and the trailer move in the reverse direction based on the front steering angle and the hitch angle to match the rear steering angle to the front steering angle while the hitch angle less than a predetermined hitch angle, and dynamically adjust the rear steering angle of the vehicle as the vehicle and the trailer move in the reverse direction based on the front steering angle and the hitch angle to maintain the hitch angle at the predetermined hitch angle.

20 Claims, 5 Drawing Sheets

METHODS AND SYSTEMS FOR TRAILER STEERING ASSISTANCE

INTRODUCTION

The technical field generally relates to vehicle trailers, and more particularly relates to methods and systems for automated and dynamic steering assistance when towing a trailer with a vehicle, particularly when maneuvering the trailer in a reverse direction.

Vehicles configured to tow a trailer capable of hauling a load are typically equipped with a connection apparatus that may include, for example, a hitch. When towing a trailer with a vehicle that includes this type of connection to the trailer, maneuvering the trailer in a reverse direction may be particularly difficult, especially for an inexperienced operator. In particular, maneuvering the trailer in reverse may require counter steering by the operator that may not be intuitive relative to the normal operation of the vehicle.

Accordingly, it is desirable to provide methods or systems that are capable of promoting ease of maneuvering a trailer, especially in a reverse direction. Furthermore, other desirable features and characteristics of the present invention will become apparent from the subsequent detailed description and the appended claims, taken in conjunction with the accompanying drawings and the foregoing technical field and background.

SUMMARY

Methods, systems, and vehicles that include the systems are provided for trailer steering assistance.

In one embodiment, a method is provided for operating a vehicle having a trailer pivotally coupled thereto for towing of the trailer. The method includes operating the vehicle to move the vehicle and the trailer in a reverse direction relative thereto, turning the vehicle with a steering input device by turning front wheels of the vehicle in a direction relative to a central longitudinal axis of the vehicle to define a front steering angle that is non-zero, the front steering angle defined between a first geometric line coplanar with and perpendicular to an axis of rotation of front wheels of the vehicle and the central longitudinal axis of the vehicle, monitoring, by a processor onboard the vehicle, the front steering angle of the vehicle and a hitch angle of the vehicle as the vehicle and the trailer move in the reverse direction, the hitch angle defined between the central longitudinal axis of the vehicle and a central longitudinal axis of the trailer, dynamically adjusting, by the processor, a rear steering angle of the vehicle based on the front steering angle and the hitch angle to match the rear steering angle to the front steering angle while the hitch angle is less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in the same direction as the front wheels relative to the central longitudinal axis of the vehicle, continuing to operate the vehicle to move the vehicle and the trailer in the reverse direction until the hitch angle is equal to the predetermined hitch angle, and dynamically adjusting, by the processor, the rear steering angle of the vehicle based on the front steering angle and the hitch angle to maintain the hitch angle at the predetermined hitch angle by turning the rear wheels in a direction opposite to the direction of the front wheels relative to the central longitudinal axis of the vehicle.

In an embodiment, the method includes, by the processor, accounting for controller gains between the vehicle and the trailer while dynamically adjusting the rear steering angle.

In an embodiment, dynamically adjusting the rear steering angle is performed in accordance with:

$$\delta_r = K_1 \delta_f + K_2 \theta$$

wherein $\delta_r$ is a desired rear steering angle, $\delta_f$ is the front steering angle, $K_1$ is a first constant based on a first controller gain associated with the front wheels of the vehicle and the trailer, $K_2$ is a second constant based on a second controller gain associated with the rear wheels of the vehicle and the trailer, and $\theta$ is the hitch angle, wherein the adjusting the rear steering angle includes adjusting the rear steering angle to the desired rear steering angle.

In an embodiment, dynamically adjusting the rear steering angle is performed in accordance with:

$$\delta_r = K_1 \delta_f + K_2 \theta$$

wherein $\delta_r$ is a desired rear steering angle, $\delta_f$ is the front steering angle, $K_1$ is a function of a speed of the vehicle and dimensions of the trailer and the vehicle associated with the front wheels of the vehicle, $K_2$ is a function of a speed of the vehicle and dimensions of the trailer and the vehicle associated with the rear wheels of the vehicle, and $\theta$ is the hitch angle, wherein adjusting the rear steering angle includes adjusting the rear steering angle to the desired rear steering angle.

In an embodiment, the method includes, by the processor, receiving trailer data that includes dimensions of a trailer coupled to the vehicle, and determining the controller gains between the vehicle and the trailer based on the trailer data.

In an embodiment, the method includes detecting, by the processor, that the vehicle is moving in the reverse direction and that the trailer is coupled to the vehicle, wherein dynamically adjusting the rear steering angle is performed automatically in response to the detection of the vehicle moving in the reverse direction with the trailer coupled to the vehicle.

In an embodiment, the method includes adjusting the steering input device such that the front steering angle is equal to zero while the hitch angle is non-zero, operating the vehicle to move the vehicle and the trailer in the reverse direction, and dynamically adjusting, by the processor, the rear steering angle of the vehicle based on the front steering angle and the hitch angle to match the rear steering angle to the hitch angle, wherein adjusting the rear steering angle to match the rear steering angle to the hitch angle includes turning the rear wheels in the same direction as an offset of the central longitudinal axis of the trailer relative to the central longitudinal axis of the vehicle.

In an embodiment, the method includes adjusting the steering input device such that the front steering angle is equal to zero while the hitch angle is equal to zero, operating the vehicle to move the vehicle and the trailer in the reverse direction, and dynamically adjusting, by the processor, the rear steering angle of the vehicle based on the front steering angle and the hitch angle to match the rear steering angle to the hitch angle, wherein adjusting the rear steering angle to match the rear steering angle to the hitch angle includes turning the rear wheels in the same direction as an offset of the central longitudinal axis of the trailer relative to the central longitudinal axis of the vehicle.

In an embodiment, dynamically adjusting, by the processor, the rear steering angle of the vehicle based on the front steering angle and the hitch angle to maintain the hitch angle at the predetermined hitch angle includes adjusting the rear steering angle in accordance with:

$$\frac{L}{D}\sin(\theta_d - \delta_r) - \tan\delta_f - \sin\delta_r = 0$$

In another embodiment, a system is provided for operating a vehicle having a trailer pivotally coupled thereto for towing of the trailer. The system includes a computer system onboard the vehicle and configured to, by a processor: monitor a front steering angle of the vehicle and a hitch angle of the vehicle as the vehicle and the trailer move in a reverse direction, the front steering angle defined between a first geometric line coplanar with and perpendicular to an axis of rotation of front wheels of the vehicle and a central longitudinal axis of the vehicle, the hitch angle defined between the central longitudinal axis of the vehicle and a central longitudinal axis of the trailer, dynamically adjust a rear steering angle of the vehicle as the vehicle and the trailer move in the reverse direction based on the front steering angle and the hitch angle to match the rear steering angle to the front steering angle while the hitch angle less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in a same direction as the front wheels relative to the central longitudinal axis of the vehicle, and dynamically adjust the rear steering angle of the vehicle as the vehicle and the trailer move in the reverse direction based on the front steering angle and the hitch angle to maintain the hitch angle at the predetermined hitch angle by turning the rear wheels in a direction opposite to the direction of the front wheels relative to the central longitudinal axis of the vehicle.

In an embodiment, the computer system is configured to, by the processor, account for controller gains between the vehicle and the trailer while dynamically adjusting the rear steering angle.

In an embodiment, the controller is configured to dynamically adjust the rear steering angle in accordance with:

$$\delta_r = K_1\delta_f + K_2\theta$$

wherein $\delta_r$ is a desired rear steering angle, $\delta_f$ is the front steering angle, $K_1$ is a first constant based on a first controller gain associated with the front wheels of the vehicle and the trailer, $K_2$ is a second constant based on a second controller gain associated with the rear wheels of the vehicle and the trailer, and $\theta$ is the hitch angle, wherein the controller is configured to adjust the rear steering angle to the desired rear steering angle.

In an embodiment, the controller is configured to dynamically adjust the rear steering angle in accordance with:

$$\delta_r = K_1\delta_f + K_2\theta$$

wherein $\delta_r$ is a desired rear steering angle, $\delta_f$ is the front steering angle, $K_1$ is a function of a speed of the vehicle and dimensions of the trailer and the vehicle associated with the front wheels of the vehicle and the trailer, $K_2$ is a function of the speed of the vehicle and dimensions of the trailer and the vehicle associated with the rear wheels of the vehicle, and $\theta$ is the hitch angle, wherein the controller is configured to adjust the rear steering angle to the desired rear steering angle.

In an embodiment, the system includes a non-transitory computer readable medium onboard the vehicle configured to store trailer data including parameters associated with a trailer coupled to the vehicle, wherein the computer system is configured to, by the processor: receive the trailer data that includes dimensions of a trailer coupled to the vehicle, and determine the controller gains between the vehicle and the trailer based on the trailer data.

In an embodiment, the computer system is configured to, by the processor, detect that the vehicle is moving in the reverse direction and that the trailer is coupled to the vehicle, wherein the controller is configured to dynamically adjust the rear steering angle automatically in response to the detection of the vehicle moving in the reverse direction with the trailer coupled to the vehicle.

In an embodiment, the computer system is configured to, by the processor: dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle non-zero, wherein the controller is configured to turn the rear wheels in the same direction as an offset of the central longitudinal axis of the trailer relative to the central longitudinal axis of the vehicle to when matching the rear steering angle to the hitch angle.

In an embodiment, the computer system is configured to, by the processor: dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle being equal to zero, wherein the controller is configured to turn the rear wheels in the same direction as an offset of the central longitudinal axis of the trailer relative to the central longitudinal axis of the vehicle to when matching the rear steering angle to the hitch angle.

In an embodiment, the controller is configured to, by the processor, dynamically adjust the rear steering angle of the vehicle based on the front steering angle and the hitch angle to maintain the hitch angle at the predetermined hitch angle includes adjusting the rear steering angle in accordance with:

$$\frac{L}{D}\sin(\theta_d - \delta_r) - \tan\delta_f - \sin\delta_r = 0$$

In yet another embodiment, a vehicle is provided that includes a trailer pivotally coupled to the vehicle for towing of the trailer, a computer system onboard the vehicle and configured to, by a processor: monitor a front steering angle of the vehicle and a hitch angle of the vehicle as the vehicle and the trailer move in a reverse direction, the front steering angle defined between a first geometric line coplanar with and perpendicular to an axis of rotation of front wheels of the vehicle and a central longitudinal axis of the vehicle, the hitch angle defined between the central longitudinal axis of the vehicle and a central longitudinal axis of the trailer, dynamically adjust a rear steering angle of the vehicle as the vehicle and the trailer move in the reverse direction based on the front steering angle and the hitch angle to match the rear steering angle to the front steering angle while the hitch angle less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in a same direction as the front wheels relative to the central longitudinal axis of the vehicle, and dynamically adjust the rear steering angle of the vehicle as the vehicle and the trailer move in the reverse direction based on the front steering angle and the hitch angle to maintain the hitch angle at the predetermined hitch angle by turning the rear wheels in a direction opposite to the direction of the front wheels relative to the central longitudinal axis of the vehicle.

In an embodiment, the computer system of the vehicle is configured to, by the processor: dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle non-zero, wherein the controller is configured to turn the rear wheels in the same direction as an offset of the central longitudinal axis of the trailer relative to the central longitudinal axis of the vehicle to when matching the rear steering angle to the hitch angle, and dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle being equal to zero, wherein the controller is configured to turn the rear wheels in the same direction as an offset of the central longitudinal axis of the trailer relative to the central longitudinal axis of the vehicle to when matching the rear steering angle to the hitch angle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
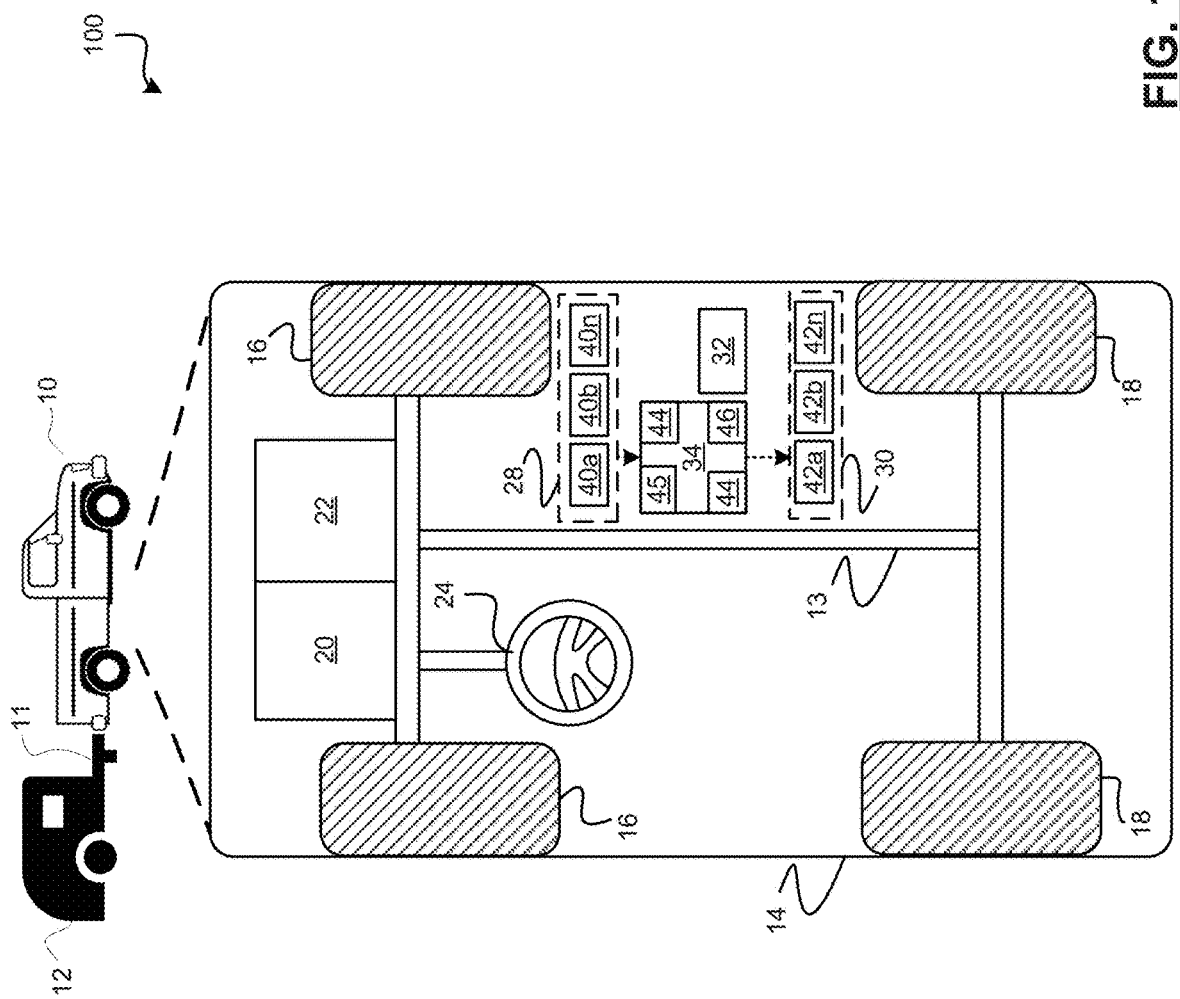
FIG. 1 is a functional block diagram of a vehicle that includes a trailer steering assistance system, in accordance with various embodiments.

With reference to FIG. 1, a trailer steering assistance system shown generally at 100 is associated with a vehicle 10 in accordance with various embodiments. The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile.

In various embodiments, the vehicle 10 may be associated with a trailer 12 capable of hauling a load. As can be appreciated, the trailer 12 may be any type of towable application having one or more wheels and is not limited to any one embodiment. The vehicle 10 is configured to couple to and connect to the trailer 12 via a connection apparatus 11 and is configured to tow the trailer 12. In various embodiments, the connection apparatus 11 comprises a hitch. In various other embodiments, the connection apparatus 11 comprises one or more other types of systems, such as a gooseneck for a fifth wheel trailer, and so on. In various embodiments, the connection apparatus 11 further comprises a wiring harness configured to communicate power and/or communication signals to and from components of the trailer 12.

As depicted in FIG. 1, the exemplary vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 near a respective corner of the body 14.

The vehicle 10 further includes a propulsion system 20, a transmission system 22, a steering system 24, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The steering system 24 influences a position of the front wheels 16. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle 10 and/or of the vehicle 10 itself. The sensing devices 40a-40n can include, but are not limited to, radars, lidars, global positioning systems, optical cameras, thermal cameras, ultrasonic sensors, inertial measurement units, pressure sensors, position sensors, speed sensors, and/or other sensors.

The actuator system 30 includes one or more actuator devices 42a-42n that control one or more vehicle features such as, but not limited to, the propulsion system 20, the transmission system 22, and the steering system 24. In various embodiments, the vehicle features can further include interior and/or exterior vehicle features such as, but are not limited to, doors, a trunk, mirrors, and cabin features such as air, music, lighting, etc. (not numbered). In various embodiments, the vehicle features include a rear wheel steering system that influences a position of the rear wheels 18 independently of the position of the front wheels 16. The rear wheel steering system may be controlled by or a component of the actuator system 30.

The data storage device 32 stores data for use in controlling the vehicle 10. In various embodiments, the data storage device 32 stores defined values for controlling the vehicle 10 and/or defined values for the trailer 12. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10 and/or trailer 12. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trailer steering assistance system 100 and, when executed by the processor 44, receive data from the sensor system 28 and process the data in order to generate control data for controlling a position of the rear wheels 18. The position is controlled in order to dynamically provide assistance to an operator of the vehicle 10 while the vehicle 10 is moving in reverse with the trailer 12 coupled thereto.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
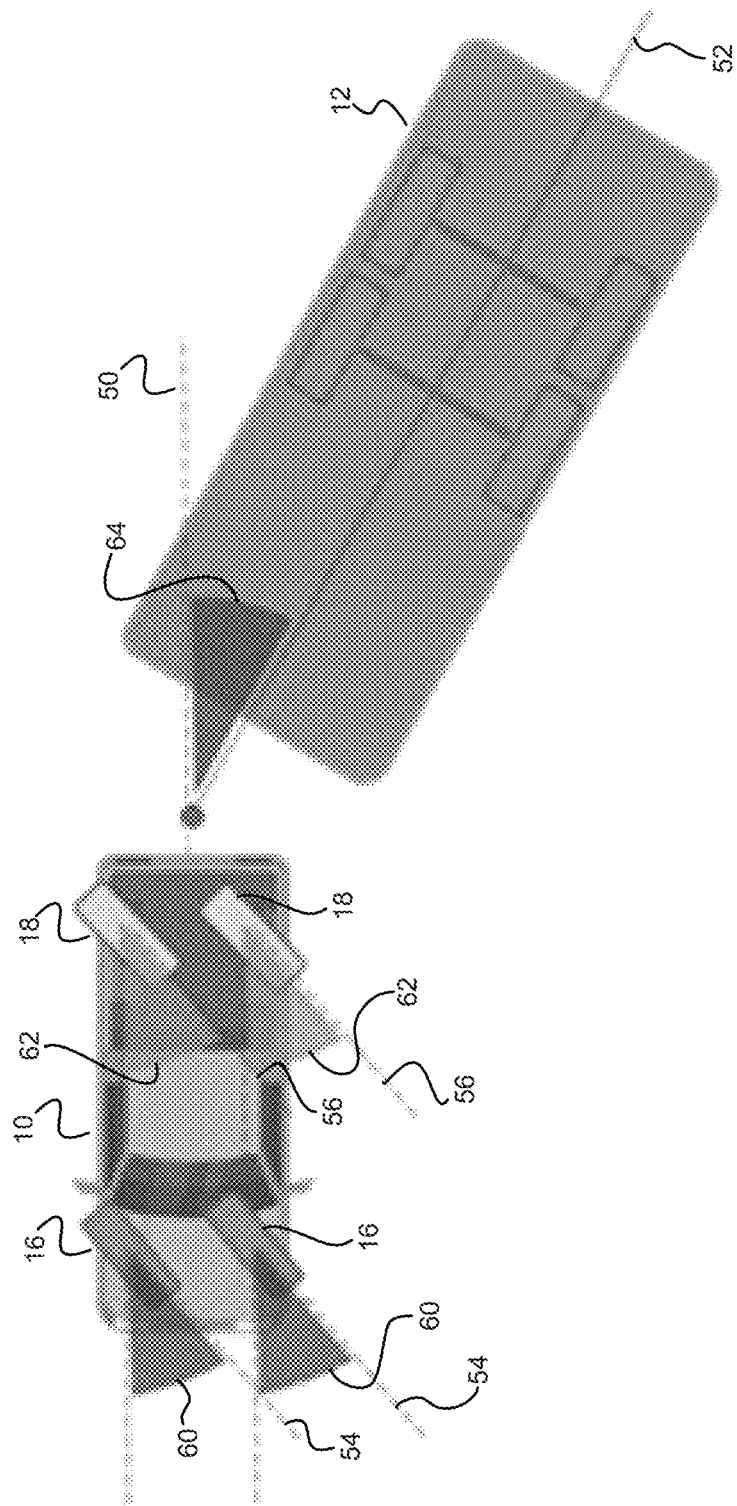
FIG. 2 is a top view of the vehicle of FIG. 1 illustrating various aspects of the vehicle and the trailer coupled thereto, in accordance with various embodiments.

Referring to FIG. 2, the vehicle 10 and the trailer 12 are presented from a top view illustrating various aspects thereof used herein to describe various embodiments of the invention. In particular, FIG. 2 presents a central longitudinal axis 50 of the vehicle 10, a central longitudinal axis 52 of the trailer 12, front steering angles 60, rear steering angles 62, and a hitch angle 64. As used herein, the front steering angles 60 are first angles as measured between first geometric lines 54 that are coplanar with and perpendicular to central axes of rotation of the front wheels 16, and the central longitudinal axis 50 of the vehicle 10 or lines parallel therewith. The rear steering angles 62 are second angles as measured between second geometric lines 56 that are coplanar with and perpendicular to central axes of rotation of the rear wheels 18 of the vehicle 10, and the central longitudinal axis 50 of the vehicle 10 or lines parallel therewith. The hitch angle 64 is a third angle as measured between the central longitudinal axis 50 of the vehicle 10, and the central longitudinal axis 52 of the trailer 12.

Figure 3:
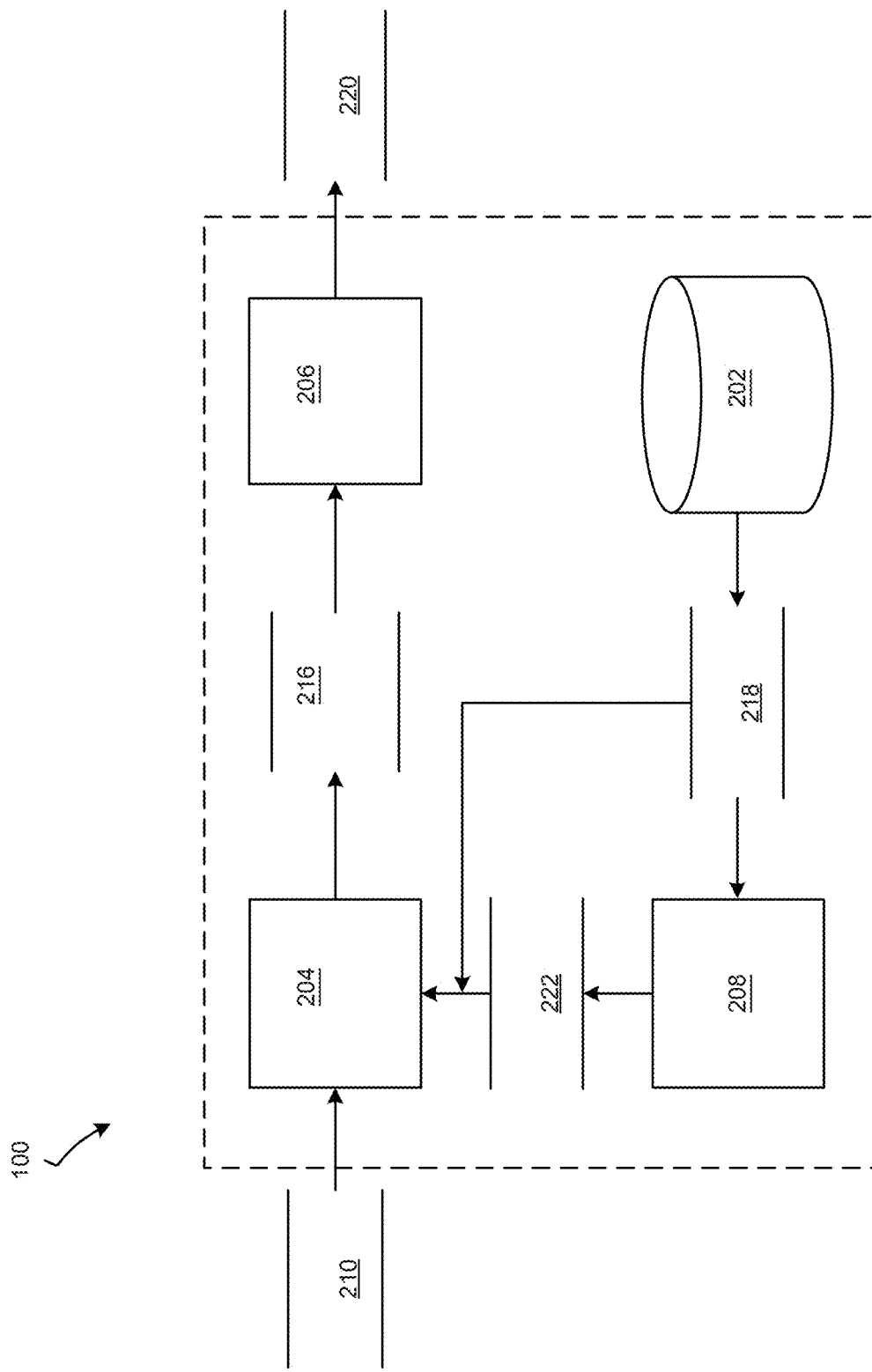
FIG. 3 is a dataflow diagram illustrating elements of the trailer steering assistance system of the vehicle of FIGS. 1-2, in accordance with various embodiments.

With reference to FIG. 3 and with continued reference to FIGS. 1-2, a dataflow diagram illustrates elements of the trailer steering assistance system 100 of FIG. 1 in accordance with various embodiments. As can be appreciated, various embodiments of the trailer steering assistance system 100 according to the present disclosure may include any number of modules embedded within the controller 34 which may be combined and/or further partitioned to similarly implement systems and methods described herein. Furthermore, inputs to the trailer steering assistance system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the trailer steering assistance system 100 includes a trailer data datastore 202, a rear steering angle module 204, a rear wheel control module 206, and a controller gains module 208.

In various embodiments, the trailer data datastore 202 stores trailer data 218 that includes information about the trailer 12, such as, but not limited to, size, shape, weight, wheel configuration, and other parameters. In some embodiments, the trailer data 218 includes information relating to gains corresponding to the vehicle 10 and the trailer 12, or one or more generic trailers. In some embodiments, the trailer data 218 may include trailer profiles. In some embodiments, the operator may input information relating to the trailer 12 to create a trailer profile specific to the trailer 12 and save such user input trailer profile to the trailer data datastore 202 as the trailer data 218.

In various embodiments, the controller gains module 208 may receive as input the trailer data 218 and determine trailer gains therefrom associated with the vehicle 10 and the trailer 12. Various methods for determining the controller gains for the vehicle 10 and the trailer 12 are well known in the art and therefore will not be discussed in detail herein. The controller gains module 208 may generate gains data 222 that includes information relating to the controller gains determined based on the trailer data 218.

In various embodiments, the rear steering angle module 204 continuously receives as input vehicle data 210, the trailer data 218, and, optionally, the gains data 222. The vehicle data 210 includes various data indicating a condition of the vehicle 10 such as vehicle speed, vehicle feature position including but not limited to the front steering angles 60, the rear steering angles 62, the hitch angle 64, and/or user input via the steering wheel. The front steering angles 60 may be detected by sensing devices 40a-40n of the sensor system 28, such as but not limited to sensors configured to detect positions of the front wheels 16 and/or a position of the steering wheel of the steering system 24. In some embodiments, the hitch angle 64 may be detected with by sensing devices 40a-40n of the sensor system 28 (e.g., ultrasound sensing devices, cameras, etc.). In other embodiments, the hitch angle 64 may be calculated and/or estimated using information generated by one or more sensing devices 40a-40n of the sensor system 28. A nonlimiting example of a method for estimating the hitch angle 64 is disclosed in U.S. Patent Application Publication No. 2022/0144028 to Saini et al., incorporated herein in its entirety.

The rear steering angle module 204 evaluates the vehicle data 210 and/or the trailer data 218 in order to determine whether adjustments to the rear steering angles 62 of the rear wheels 18 of the vehicle 10 are desirable to provide assistance to the operator of the vehicle 10 while the vehicle 10 is moving in reverse with the trailer 12 coupled thereto. For example, adjustments to the rear steering angles 62 may be desirable when the vehicle 10 is moving in reverse with the trailer 12 coupled thereto in order to promote ease of steering the trailer 12 as the vehicle 10 moves in reverse. Such conditions may be automatically detected by the system 100 based on the vehicle data 210 and/or may be indicated by the operator (e.g., manually initiating a trailer mode).

Nonlimiting examples of steering assistance provided by the system 100 may include, but are not limited to, eliminating counter steering by the operator of the vehicle 10, maintaining the hitch angle 64 at a constant value as the vehicle 10 moves in reverse, maintaining a constant direction of the trailer 12 as the vehicle 10 moves in reverse and as the vehicle 10 is maneuvered to a position wherein the longitudinal axis 50 of the vehicle 10 is aligned with the longitudinal axis 52 of the trailer 12, providing for alignment of the longitudinal axis 50 of the vehicle 10 and the longitudinal axis 52 of the trailer 12 as the vehicle 10 moves in reverse without input to the steering system 24 by the operator of the vehicle 10, maintaining alignment of the longitudinal axis 50 of the vehicle 10 and the longitudinal axis 52 of the trailer 12 as the vehicle 10 moves in reverse, and/or maintaining alignment of the longitudinal axis 50 of the vehicle 10 and the longitudinal axis 52 of the trailer 12 as the vehicle 10 moves in reverse without input to the steering system 24 by the operator of the vehicle 10.

When adjustments to the rear steering angles 62 are desired, the rear steering angle module 204 dynamically determines adjustments to the rear steering angles 62 and generates rear steering angle data 216 that includes information about the adjustments to the rear steering angles 62 for the rear wheels 18. In some embodiments, the rear steering angle module 204 determines the adjustments to the rear steering angles 62 using, at least in part, equation 1 below:

$$\delta_r = K_1 \delta_f + K_2 \theta \tag{1}$$

wherein $\delta_r$ is the desired rear steering angles 62, $\delta_f$ is the front steering angle 60, $K_1$ is a first constant based on a first controller gain associated with the front wheels 16 of the vehicle 10 and the trailer 12, $K_2$ is a second constant based on a second controller gain associated with the rear wheels 18 of the vehicle 10 and the trailer 12, and θ is the hitch angle 64. The constants $K_1$ and $K_2$ may be generic values suitable for an average trailer, or may be specific to the trailer 12 coupled to the vehicle 10. In some embodiments, the operator may be prompted by the system 100 to input, for example, via a graphic user interface (GUI) of a display screen to manually input certain parameters of the trailer 12 (e.g., dimensions) to create a user input trailer profile specific to the trailer 12 or choose from a list of pre-programed trailer profiles stored in the trailer data datastore 202. In such embodiments, the constants $K_1$ and $K_2$ may be provided within the pre-programed trailer profiles or calculated based on the user input trailer profile specific to the trailer 12. In some embodiments, $K_1$ and $K_2$ are not merely constants but rather functions of a speed of the vehicle 10 and dimensions of the trailer 12 and the vehicle 10 associated with the front wheels 16 and the rear wheels 18, respectively.

In various embodiments, the rear wheel control module 206 receives as input the rear steering angle data 216. The rear wheel control module 268 determines control data 220 to control the position of the rear wheels 18 to achieve the adjustments to the rear steering angles 62 indicated by the rear steering angle data 216. For example, the rear wheel control module 206 determines the control data 220 based on the current position of the rear wheels 18 as indicated by the vehicle data 210. The rear wheel control module 206 generates and transmits the control data 220 to the actuator system 30 such that the desired position of the rear wheels 18 is achieved, thereby enabling steering assistance to the operator of the vehicle 10. The control data 220 may be used by the actuator system 30 in a manner consistent with rear steering systems known in the art.

Figure 4:
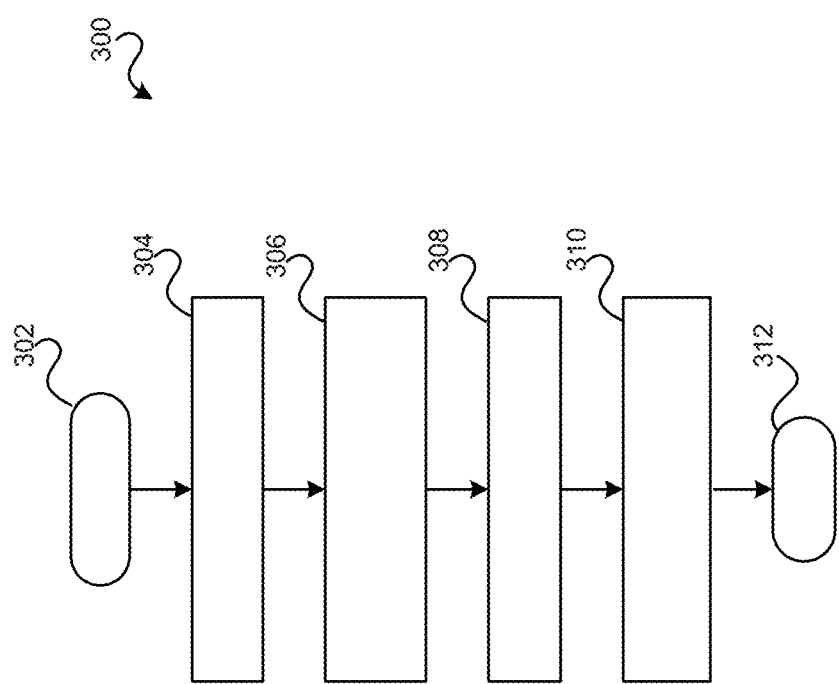
FIG. 4 is a flowchart of a process for maneuvering a trailer as performed by the trailer steering assistance system of the vehicle of FIGS. 1 and 2, in accordance with exemplary embodiments.

With reference now to FIG. 4 and with continued reference to FIGS. 1-3, a flowchart provides a method 300 for providing steering assistance to the operator of the vehicle 10 while the vehicle 10 is moving in reverse with the trailer 12 coupled thereto as performed by the trailer steering assistance system 100, in accordance with exemplary embodiments. As can be appreciated in light of the disclosure, the order of operation within the method 300 is not limited to the sequential execution as illustrated in FIG. 4, but may be performed in one or more varying orders as applicable and in accordance with the present disclosure. In various embodiments, the method 300 can be scheduled to run based on one or more predetermined events, and/or can run continuously during operation of the vehicle 10.

In one example, the method 300 may begin at 302. A trailer mode of the vehicle 10 is initiated at 304 that indicates that the vehicle 10 is coupled to the trailer 12. The trailer mode may be initiated manually by the operator (e.g., via interaction with a graphic user interface on a visual display) and/or initiated automatically by the controller 34 in response to receiving certain information related to such indication (e.g., signal received from the sensor system 28 or a communication signal received via the wiring harness coupling the vehicle 10 to the trailer 12). The trailer mode may be activated continuously while the trailer 12 is coupled to the vehicle 10 or activated immediately prior to and continuously executed while the vehicle 10 is performing a reversing maneuver wherein the vehicle 10 is moving in a reverse direction with the trailer 12 coupled thereto.

The vehicle data 210 and the trailer data 218 is received at 306. The vehicle data 210 and/or trailer data 218 may be evaluated to determine if a change in the rear steering angles 62 is desired at 306 and, if so, adjustments to the rear steering angles 62 are determined at 308. Upon determining that adjustments in the rear steering angles 62 are desired and determined, the method 300 continues with modifying positions of the rear wheels 18 at 310 by generating the control data 220 and transmitting the control data 220 to the rear wheel steering system of the actuator system 30. Thereafter, the method 300 may end at 312.

Figures 5, 6:
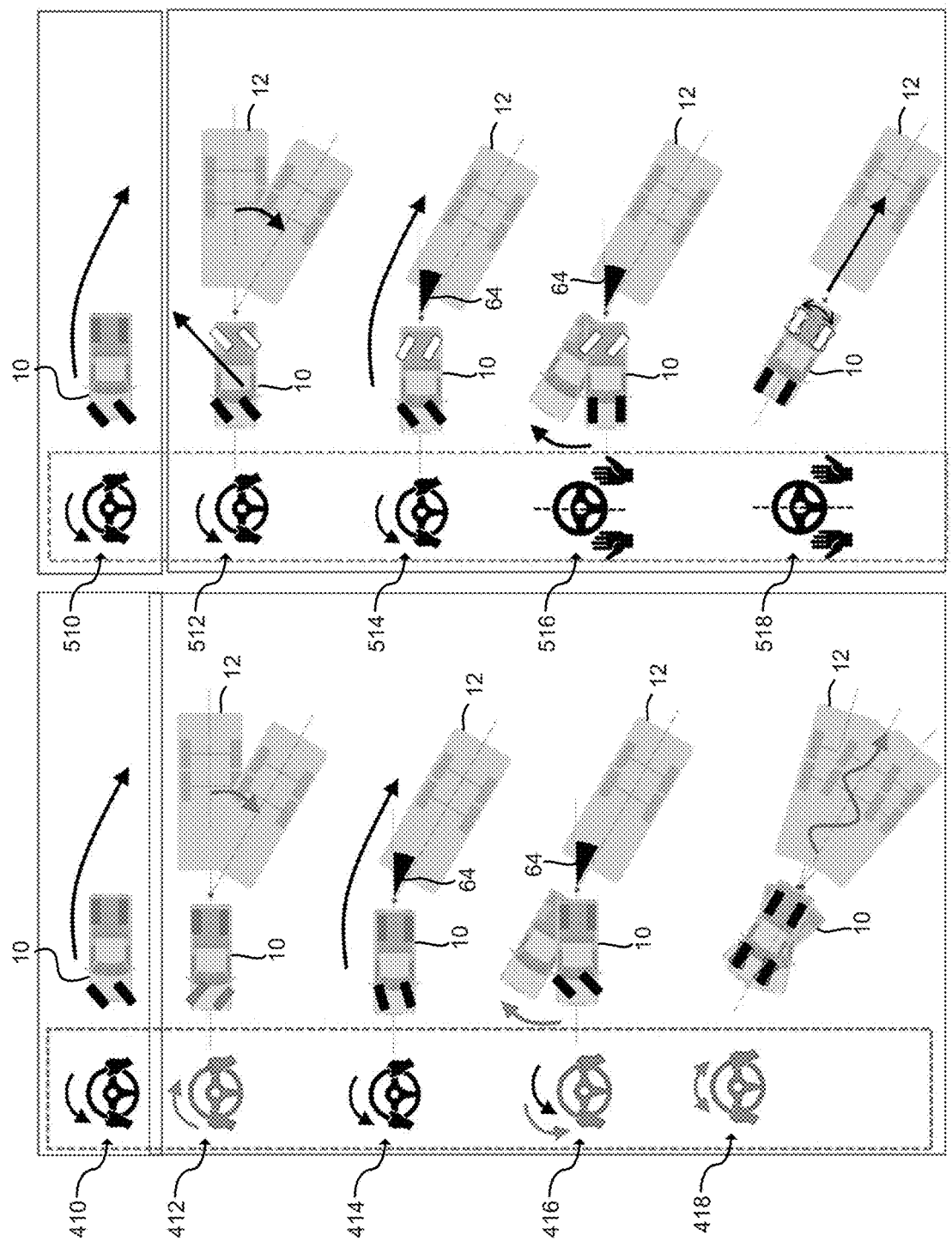
FIG. 5 is a top view of the vehicle of FIGS. 1-2 maneuvering a trailer coupled thereto without the trailer steering assistance system.
FIG. 6 is a top view of the vehicle of FIGS. 1-2 maneuvering the trailer coupled thereto with the trailer steering assistance system.

FIGS. 5-6 provide an exemplary comparison between certain maneuvers performed with and without the system 100, respectively. Referring first to FIG. 5, various maneuvers are illustrated while operating the vehicle 10 without the system 100 and without rear wheel steering. At 410, the operator rotates the steering wheel of the steering system 24 counterclockwise and the front wheels 16 turn based thereon toward a driver's side of the vehicle 10. As the operator drives the vehicle 10 in reverse, the vehicle 10 moves in a direction (represented with an arrow) corresponding to the front steering angles 60 of the front wheels 16, that is, in a driver's side direction when viewed from above as represented. This illustrates a simple reverse maneuver performed without the trailer 12. The remainder of the maneuvers of FIG. 5 are performed with the trailer 12 coupled to the vehicle 10.

At 412, the operator rotates the steering wheel of the steering system 24 clockwise and the front wheels 16 turn based thereon toward a passenger's side of the vehicle 10. As the operator drives the vehicle 10 in reverse, the vehicle 10 moves in a direction corresponding to the front steering angles 60 of the front wheels 16, that is, in the passenger's side direction. However, due to the connection apparatus 11, the trailer 12 moves in the driver's side direction while increasing the hitch angle 64. Once a desired hitch angle 64 is achieved, the operator rotates the steering wheel counterclockwise at 414 to maintain the hitch angle 64 as the vehicle 10 and the trailer 12 move in reverse.

Once a desired direction of the trailer 12 has been achieved, the operator rotates the steering wheel counterclockwise at 416 to decrease the hitch angle 64 and eventually align the longitudinal axis 50 of the vehicle 10 and the longitudinal axis 52 of the trailer 12. If the operator desires to continue moving in reverse in the desired direction, the alignment of the vehicle 10 and the trailer 12 must be maintained. However, this is often difficult and requires the operator to rotate the steering wheel in clockwise and/or counterclockwise directions to make small corrections typically resulting in both the vehicle 10 and the trailer 12 moving along wavy paths (represented with arrow) generally centered along the desired direction.

Referring now to FIG. 6, the same types of maneuvers are illustrated while using the system 100. At 510, the operator rotates the steering wheel (i.e., steering input device) of the steering system 24 counterclockwise and the front wheels 16 turn based thereon toward the driver's side of the vehicle 10. As the operator drives the vehicle 10 in reverse, the vehicle 10 moves in a direction (represented with an arrow) corresponding to the front steering angles 60 of the front wheels 16, that is, in the driver's side direction when viewed from above as represented. This illustrates a simple reverse maneuver performed without the trailer 12. The remainder of the maneuvers of FIG. 6 are performed with the trailer 12 coupled to the vehicle 10.

At 512, the operator rotates the steering wheel of the steering system 24 counterclockwise and the front wheels 16 turn in a direction relative to the central longitudinal axis 50 of the vehicle 1 based on the steering input, in this instance, toward the driver's side of the vehicle 10. As the operator drives the vehicle 10 in reverse, the system 100 turns the rear wheels 18 to match the rear steering angle 62 to the front steering angle 60 by turning the rear wheels 18 in the same direction as the front wheels 16, that is, toward the driver's side of the vehicle 10. As such, the vehicle 10 moves in a sideways direction corresponding to the front steering angles 60 of the front wheels 16 and the rear steering angles 62 of the rear wheels 18, that is, in a sideways direction in the passenger's side direction. Due to the connection apparatus 11, the trailer 12 moves in the driver's side direction while increasing a hitch angle 64. In various embodiments, the system 100 may set the rear steering angles 62 to be equal or substantially equal to the front steering angles 60 (e.g., as indicated by user input via the steering wheel), that is, $\delta_r$ is equal to $\delta_f$, with the rear wheels 18 turned in the same direction as the front wheels 16 relative to the central longitudinal axis 50 of the vehicle 10.

If a predetermined hitch angle $\theta_d$ is achieved (at 514), the system 100 automatically adjusts the positions of the rear wheels 18 such that the hitch angle 64 is maintained as the vehicle 10 moves in reverse. That is, the system 100 limits the hitch angle 64 to a value equal to or less than the predetermined hitch angle $\theta_d$. In various embodiments, the predetermined hitch angle $\theta_d$ may be maintained by turning the rear wheels 18 in a direction that is opposite to the direction of the front wheels 16 relative to the central longitudinal axis 50 of the vehicle 10. Notably, the steering input from the operator does not change at 514 to achieve this outcome. In various embodiments, the predetermined hitch angle $\theta_d$ may be proportional with the front steering angles 60, as represented in equation 2 below:

$$\theta d = C \delta f \quad (2)$$

where C is a predetermined constant value. The system 100 may maintain the predetermined hitch angle $\theta_d$ constant by adjusting the rear steering angles 62 according to equation 3 below:

$$\frac{L}{D}\sin(\theta_d - \delta_r) - \tan \delta_f - \sin \delta_r = 0 \quad (3)$$

where L is a wheelbase of the vehicle 10, that is, a dimension as measured between centers of the front wheels 16 and the rear wheels 18, and D is a dimension as measured between the connection apparatus 11 and the axles of the trailer 12 along the central longitudinal axis 52 of the trailer 12. An approximate solution to equation 3 is represented as equation 4 below:

$$\delta_r \approx \frac{L\theta_d - D\delta_f}{D + L} \quad (4)$$

Once a desired direction of the trailer 12 has been achieved by the operator, the operator may release the steering wheel or rotate the steering wheel clockwise to a null position (i.e., a front steering angle 60 equal to zero) thereof at 516 to decrease the hitch angle 64 and eventually align the longitudinal axis 50 of the vehicle 10 and the longitudinal axis 52 of the trailer 12 (i.e., achieve a hitch angle 64 equal to zero). During this maneuver, the system 100 continues to monitor and adjust the rear wheels 18 to provide for a smooth transition. In some embodiments, the system 100 dynamically determines second adjustments to the rear steering angle 62 based on the vehicle data 210 and the trailer data 218 while the front steering angle 60 has a value equal to zero, the hitch angle 64 has a value that is non-zero (i.e., greater or less than zero), and the vehicle 10 is moving in the reverse direction. The second adjustments to the rear steering angle 62 are configured to transition the vehicle 10 to a position wherein the longitudinal axis 50 of the vehicle 10 is aligned with the longitudinal axis 52 of the trailer 12 while simultaneously maintaining a direction of movement of the trailer 12. The system 100 may generate the control data 220 to control the rear wheel steering system of the vehicle 10 to modify the rear steering angle 62 of the rear wheels 18 of the vehicle 10 based on the second adjustments as the vehicle 10 moves in the reverse direction. In various embodiments, the rear wheels 18 may be turned in the same direction as an offset of the central longitudinal axis 52 of the trailer 12 relative to the central longitudinal axis 50 of the vehicle 10. In various embodiments, the system 100 may continuously adjust the rear steering angles 62 to match or be equal to the hitch angle 64. In various embodiments, the rear wheels 18 are aligned with the central longitudinal axis 52 of the trailer 12.

If the operator desires to continue moving in reverse in the desired direction after the vehicle 10 and the trailer 12 are aligned, the alignment of the vehicle 10 and the trailer 12 may be maintained by the system 100 by making any small corrections necessary by modifying the position of the rear wheels 18 thereby allowing the trailer 12 to move in a relatively uniform path in the desired direction without any steering input from the driver at 518. In some embodiments, the system 100 dynamically determines third adjustments to the rear steering angle 62 based on the vehicle data 210 and the trailer data 218 while the front steering angle 60 has a value equal to zero, the hitch angle 64 has a value equal to zero, and the vehicle 10 is moving in the reverse direction. The third adjustments to the rear steering angle 62 are configured to maintain alignment of the longitudinal axis 50 of the vehicle 10 and the longitudinal axis 52 of the trailer 12. The system 100 may generate the control data 220 to control the rear wheel steering system of the vehicle 10 to modify the rear steering angle 62 of the rear wheels 18 of the vehicle 10 based on the third adjustments as the vehicle 10 moves in the reverse direction. In various embodiments, the system 100 maintains alignment of the vehicle 10 and the trailer 12 by continuously adjusting the rear steering angles 62 to be equal to the hitch angle 64.

A comparison of the examples of FIGS. 5 and 6 illustrate some of the benefits of the system 100. For example, without the system 100 as represented in FIG. 5, the operator is required to perform counter steering to maneuver the trailer 12 in the desired direction, that is, rotating the steering wheel in an opposite direction than normal to move in the desired direction. Counter steering is generally not intuitive to those who do not routinely perform such actions. In contrast, use of the system 100 as represented in FIG. 6 eliminates the requirement of counter steering. Instead, the operator is able to drive the vehicle 10 in substantially the same manner as would be done when the trailer 12 is not coupled thereto. Furthermore, once the trailer 12 has been positioned as desired, the system 100 manages all steering as the vehicle 10 moves in reverse, significantly simplifying the process and alleviating the operator from such responsibility.

It should be noted that the description of the embodiments disclosed herein refers to the pair of front steering angles 60 being equal to each other and the rear steering angles 62 being equal to each other during turning maneuvers. However, the front steering angles 60 between the pair of front wheels 16 may not be equal, and the rear steering angles 62 between the pair of rear wheels 18 may not be equal. For example, during a turning maneuver, the vehicle 10 may have a turning center point defined by an intersection of the axis of rotation of the driver's side front wheel 16, the axis of rotation of the passenger's side front wheel 16, and the axis of rotation of the rear wheels 18 (assuming rear steering functions are not performed during the turn). Each of the front wheels 16 move along a respective geometric circle about the turning center point. Since the outside front wheel 16 is further from the turning center point (i.e., has a larger radius), the outside front wheel 16 should turn at a lesser angle than the inside front wheel 16, referred to as "toe-out." As such, references herein to, for example, matching the rear steering angle 62 to the front steering angle 60 may, in various embodiments, more precisely be interpreted as matching the rear steering angle 62 of the driver's side rear wheel 18 to the front steering angle 60 of the driver's side front wheel 16, and matching the rear steering angle 62 of the passenger's side rear wheel 18 to the front steering angle 60 of the passenger's side front wheel 16.

As used herein, matching the rear steering angle 62 to the front steering angle 60 or the hitch angle 64 may include, in various embodiments, adjusting the rear steering angle 62 to be equal to the front steering angle 60 or the hitch angle 64, or, in various embodiments, may include adjusting the rear steering angle 62 to be substantially equal (e.g., within 3 degrees or less) to the front steering angle 60 or the hitch angle 64.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for operating a vehicle having a trailer pivotally coupled thereto for towing of the trailer, the method comprising:
    operating the vehicle to move the vehicle and the trailer in a reverse direction relative thereto;
    turning the vehicle with a steering input device by turning front wheels of the vehicle in a direction relative to a central longitudinal axis of the vehicle to define a front steering angle that is non-zero, the front steering angle defined between a first geometric line coplanar with and perpendicular to an axis of rotation of the front wheels of the vehicle and the central longitudinal axis of the vehicle;
    monitoring, by a processor onboard the vehicle, the front steering angle of the vehicle and a hitch angle of the vehicle as the vehicle and the trailer move in the reverse direction, the hitch angle defined between the central longitudinal axis of the vehicle and a central longitudinal axis of the trailer;
    dynamically adjusting, by the processor, a rear steering angle of the vehicle based on the front steering angle and the hitch angle to match the rear steering angle to the front steering angle while the hitch angle is less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in the same direction as the front wheels relative to the central longitudinal axis of the vehicle;
    continuing to operate the vehicle to move the vehicle and the trailer in the reverse direction until the hitch angle is equal to the predetermined hitch angle; and
    dynamically adjusting, by the processor, the rear steering angle of the vehicle based on the front steering angle and the hitch angle to maintain the hitch angle at the predetermined hitch angle by turning the rear wheels in a direction opposite to the direction of the front wheels relative to the central longitudinal axis of the vehicle.

2. The method of claim 1, further comprising, by the processor, accounting for controller gains between the vehicle and the trailer while dynamically adjusting the rear steering angle.

3. The method of claim 2, wherein dynamically adjusting the rear steering angle is performed in accordance with:

$$\delta_r = K_1 \delta_f + K_2 \theta,$$

wherein $\delta_r$ is a desired rear steering angle, $\delta_f$ is the front steering angle, $K_1$ is a first constant based on a first controller gain associated with the front wheels of the vehicle and the trailer, $K_2$ is a second constant based on a second controller gain associated with the rear wheels of the vehicle and the trailer, and $\theta$ is the hitch angle, wherein the adjusting the rear steering angle includes adjusting the rear steering angle to the desired rear steering angle.

4. The method of claim 2, wherein dynamically adjusting the rear steering angle is performed in accordance with:

$$\delta_r = K_1 \delta_f + K_2 \theta,$$

wherein $\delta_r$ is a desired rear steering angle, $\delta_f$ is the front steering angle, $K_1$ is a function of a speed of the vehicle and dimensions of the trailer and the vehicle associated with the front wheels of the vehicle, $K_2$ is a function of the speed of the vehicle and dimensions of the trailer and the vehicle associated with the rear wheels of the vehicle, and $\theta$ is the hitch angle, wherein adjusting the rear steering angle includes adjusting the rear steering angle to the desired rear steering angle.

5. The method of claim 2, further comprising:
    receiving, by the processor, trailer data that includes dimensions of the trailer coupled to the vehicle; and
    determining, by the processor, the controller gains between the vehicle and the trailer based on the trailer data.

6. The method of claim 1, further comprising detecting, by the processor, that the vehicle is moving in the reverse direction and that the trailer is coupled to the vehicle, wherein dynamically adjusting the rear steering angle is performed automatically in response to the detection of the vehicle moving in the reverse direction with the trailer coupled to the vehicle.

7. The method of claim 1, further comprising:
    adjusting the steering input device such that the front steering angle is equal to zero while the hitch angle is non-zero;
    operating the vehicle to move the vehicle and the trailer in the reverse direction; and
    dynamically adjusting, by the processor, the rear steering angle of the vehicle based on the front steering angle and the hitch angle to match the rear steering angle to the hitch angle, wherein adjusting the rear steering angle to match the rear steering angle to the hitch angle includes turning the rear wheels in a same direction as an offset of the central longitudinal axis of the trailer relative to the central longitudinal axis of the vehicle.

8. The method of claim 1, further comprising:
adjusting the steering input device such that the front steering angle is equal to zero while the hitch angle is equal to zero;
operating the vehicle to move the vehicle and the trailer in the reverse direction; and
dynamically adjusting, by the processor, the rear steering angle of the vehicle based on the front steering angle and the hitch angle to match the rear steering angle to the hitch angle, wherein adjusting the rear steering angle to match the rear steering angle to the hitch angle includes turning the rear wheels in a same direction as an offset of the central longitudinal axis of the trailer relative to the central longitudinal axis of the vehicle.

9. The method of claim 1, wherein dynamically adjusting, by the processor, the rear steering angle of the vehicle based on the front steering angle and the hitch angle to maintain the hitch angle at the predetermined hitch angle includes adjusting the rear steering angle in accordance with:

$$\frac{L}{D}\sin(\theta_d - \delta_r) - \tan\delta_f - \sin\delta_r = 0.$$

10. A system for operating a vehicle having a trailer pivotally coupled thereto for towing of the trailer, the system comprising:
a computer system onboard the vehicle and configured to, by a processor:
monitor a front steering angle of the vehicle and a hitch angle of the vehicle as the vehicle and the trailer move in a reverse direction, the front steering angle defined between a first geometric line coplanar with and perpendicular to an axis of rotation of front wheels of the vehicle and a central longitudinal axis of the vehicle, the hitch angle defined between the central longitudinal axis of the vehicle and a central longitudinal axis of the trailer;
dynamically adjust a rear steering angle of the vehicle as the vehicle and the trailer move in the reverse direction based on the front steering angle and the hitch angle to match the rear steering angle to the front steering angle while the hitch angle is less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in a same direction as the front wheels relative to the central longitudinal axis of the vehicle; and
dynamically adjust the rear steering angle of the vehicle as the vehicle and the trailer move in the reverse direction based on the front steering angle and the hitch angle to maintain the hitch angle at the predetermined hitch angle by turning the rear wheels in a direction opposite to the direction of the front wheels relative to the central longitudinal axis of the vehicle.

11. The system of claim 10, wherein the computer system is configured to, by the processor, account for controller gains between the vehicle and the trailer while dynamically adjusting the rear steering angle.

12. The system of claim 11, wherein the computer system is configured to, by the processor, dynamically adjust the rear steering angle in accordance with:

$$\delta_r = K_1\delta_f + K_2\theta,$$

wherein $\delta_r$ is a desired rear steering angle, $\delta_f$ is the front steering angle, $K_1$ is a first constant based on a first controller gain associated with the front wheels of the vehicle and the trailer, $K_2$ is a second constant based on a second controller gain associated with the rear wheels of the vehicle and the trailer, and $\theta$ is the hitch angle, wherein the computer system is configured to adjust the rear steering angle to the desired rear steering angle.

13. The system of claim 11, wherein the computer system is configured to, by the processor, dynamically adjust the rear steering angle in accordance with:

$$\delta_r = K_1\delta_f + K_2\theta,$$

wherein $\delta_r$ is a desired rear steering angle, $\delta_f$ is the front steering angle, $K_1$ is a function of a speed of the vehicle and dimensions of the trailer and the vehicle associated with the front wheels of the vehicle and the trailer, $K_2$ is a function of the speed of the vehicle and dimensions of the trailer and the vehicle associated with the rear wheels of the vehicle, and $\theta$ is the hitch angle, wherein the computer system is configured to adjust the rear steering angle to the desired rear steering angle.

14. The system of claim 11, further comprising
a non-transitory computer readable medium onboard the vehicle configured to store trailer data including parameters associated with the trailer coupled to the vehicle;
wherein the computer system is configured to, by the processor:
receive the trailer data that includes dimensions of the trailer coupled to the vehicle; and
determine the controller gains between the vehicle and the trailer based on the trailer data.

15. The system of claim 10, wherein the computer system is configured to, by the processor, detect that the vehicle is moving in the reverse direction and that the trailer is coupled to the vehicle, wherein the computer system is configured to, by the processor, dynamically adjust the rear steering angle automatically in response to the detection of the vehicle moving in the reverse direction with the trailer coupled to the vehicle.

16. The system of claim 10, wherein the computer system is configured to, by the processor:
dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle is non-zero, wherein the computer system is configured to, by the processor, turn the rear wheels in a same direction as an offset of the central longitudinal axis of the trailer relative to the central longitudinal axis of the vehicle when matching the rear steering angle to the hitch angle.

17. The system of claim 10, wherein the computer system is configured to, by the processor:
dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle being equal to zero, wherein the computer system is configured to turn the rear wheels in the same direction as an offset of the central longitudinal axis of the trailer relative to the central longitudinal axis of the vehicle to when matching the rear steering angle to the hitch angle.

18. The system of claim 10, wherein the computer system is configured to, by the processor, dynamically adjust the rear steering angle of the vehicle based on the front steering angle and the hitch angle to maintain the hitch angle at the predetermined hitch angle includes adjusting the rear steering angle in accordance with:

$$\frac{L}{D}\sin(\theta_d - \delta_r) - \tan \delta_f - \sin \delta_r = 0.$$

19. A vehicle comprising:
a trailer pivotally coupled to the vehicle for towing of the trailer;
a computer system onboard the vehicle and configured to, by a processor:
  monitor a front steering angle of the vehicle and a hitch angle of the vehicle as the vehicle and the trailer move in a reverse direction, the front steering angle defined between a first geometric line coplanar with and perpendicular to an axis of rotation of front wheels of the vehicle and a central longitudinal axis of the vehicle, the hitch angle defined between the central longitudinal axis of the vehicle and a central longitudinal axis of the trailer;
  dynamically adjust a rear steering angle of the vehicle as the vehicle and the trailer move in the reverse direction based on the front steering angle and the hitch angle to match the rear steering angle to the front steering angle while the hitch angle is less than a predetermined hitch angle, the rear steering angle defined between a second geometric line coplanar with and perpendicular to an axis of rotation of rear wheels of the vehicle and the central longitudinal axis of the vehicle, wherein matching the rear steering angle to the front steering angle includes turning the rear wheels in a same direction as the front wheels relative to the central longitudinal axis of the vehicle; and
  dynamically adjust the rear steering angle of the vehicle as the vehicle and the trailer move in the reverse direction based on the front steering angle and the hitch angle to maintain the hitch angle at the predetermined hitch angle by turning the rear wheels in a direction opposite to the direction of the front wheels relative to the central longitudinal axis of the vehicle.

20. The vehicle of claim 19, wherein the computer system is configured to, by the processor:
  dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle is non-zero, wherein the computer system is configured to, by the processor, turn the rear wheels in a same direction as an offset of the central longitudinal axis of the trailer relative to the central longitudinal axis of the vehicle when matching the rear steering angle to the hitch angle; and
  dynamically adjust the rear steering angle of the vehicle based on the front steering angle and the hitch angle to match the rear steering angle to the hitch angle in response to the vehicle and the trailer moving in the reverse direction, the front steering angle being equal to zero, and the hitch angle being equal to zero, wherein the computer system is configured to, by the processor, turn the rear wheels in the same direction as the offset of the central longitudinal axis of the trailer relative to the central longitudinal axis of the vehicle to when matching the rear steering angle to the hitch angle.

* * * * *